US010990103B2

United States Patent
Rottkamp et al.

(10) Patent No.: US 10,990,103 B2
(45) Date of Patent: Apr. 27, 2021

(54) METHOD FOR OPERATING A VEHICLE SYSTEM DESIGNED TO DETERMINE A TRAJECTORY TO BE FOLLOWED AND/OR TO PERFORM DRIVING INTERVENTIONS, METHOD FOR OPERATING A CONTROL SYSTEM, AND MOTOR VEHICLE

(71) Applicant: Audi AG, Ingolstadt (DE)

(72) Inventors: Lukas Rottkamp, Ingolstadt (DE); Florian Haubner, Willanzheim (DE)

(73) Assignee: Audi AG, Ingolstadt (DE)

( * ) Notice: Subject to any disclaimer, the term of this patent is extended or adjusted under 35 U.S.C. 154(b) by 208 days.

(21) Appl. No.: 16/310,681

(22) PCT Filed: May 29, 2017

(86) PCT No.: PCT/EP2017/062842
§ 371 (c)(1),
(2) Date: Jan. 11, 2019

(87) PCT Pub. No.: WO2017/220286
PCT Pub. Date: Dec. 28, 2017

(65) Prior Publication Data
US 2019/0179324 A1   Jun. 13, 2019

(30) Foreign Application Priority Data
Jun. 21, 2016 (DE) ..................... 10 2016 007 567.8

(51) Int. Cl.
*G05D 1/02* (2020.01)
*G08G 1/01* (2006.01)
(Continued)

(52) U.S. Cl.
CPC ......... *G05D 1/0214* (2013.01); *B60W 30/095* (2013.01); *B60W 30/12* (2013.01);
(Continued)

(58) Field of Classification Search
CPC .. G05D 1/0214; G05D 1/0276; G08G 1/0112; G08G 1/096741; G08G 1/0129;
(Continued)

(56) References Cited

U.S. PATENT DOCUMENTS 8,751,157 B2  6/2014  Simon
8,825,265 B1  9/2014  Ferguson et al.
(Continued)

FOREIGN PATENT DOCUMENTS

DE           10349631 A1   5/2005
DE      102010033729 A1   2/2012
(Continued)

OTHER PUBLICATIONS

International Search Report and Written Opinion of the International Search Authority directed to related International Patent Application No. PCT/EP2017/062842, dated Sep. 15, 2017, with attached English-language translation; 25 pages.

*Primary Examiner* — Michael J Zanelli
(74) *Attorney, Agent, or Firm* — Sterne, Kessler, Goldstein & Fox P.L.L.C.

(57) ABSTRACT

A method for operating a vehicle system of a motor vehicle is disclosed. The method is designed to determine a trajectory to be followed and/or to perform driving interventions, wherein a communication device on the vehicle system side receives, from a computation device external to the motor vehicle, a lane map describing travel lanes that are determined by the computation device from actual driving courses of other vehicles in the past and that relate to a region surrounding the motor vehicle, and a control device on the vehicle system side determines a trajectory to be followed by the motor vehicle and/or performs a transverse guiding intervention depending on the lane map.

15 Claims, 2 Drawing Sheets

(51) Int. Cl.
*G08G 1/0967* (2006.01)
*G08G 1/16* (2006.01)
*B60W 30/12* (2020.01)
*B62D 15/02* (2006.01)
*B60W 30/095* (2012.01)
*B60W 50/00* (2006.01)

(52) U.S. Cl.
CPC ..... *B62D 15/0255* (2013.01); *B62D 15/0265* (2013.01); *G05D 1/0276* (2013.01); *G08G 1/0112* (2013.01); *G08G 1/0129* (2013.01); *G08G 1/0145* (2013.01); *G08G 1/09675* (2013.01); *G08G 1/096725* (2013.01); *G08G 1/096741* (2013.01); *G08G 1/096775* (2013.01); *G08G 1/167* (2013.01); *B60W 2050/0089* (2013.01); *B60W 2556/45* (2020.02); *G05D 2201/0213* (2013.01); *G08G 1/164* (2013.01)

(58) Field of Classification Search
CPC ........... G08G 1/0145; G08G 1/096725; G08G 1/096775; G08G 1/167; G08G 1/164; B60W 30/12; B60W 2556/45; B60W 2050/0089; B62D 15/0255
See application file for complete search history.

(56) References Cited

U.S. PATENT DOCUMENTS

| | | | |
|---|---|---|---|
| 9,053,631 B2 | 6/2015 | Skupin | |
| 9,355,562 B1 | 5/2016 | Ferguson | |
| 9,784,585 B2 | 10/2017 | Fausten | |
| 10,234,300 B2 * | 3/2019 | Martyniv | G06Q 50/30 |
| 2008/0291276 A1 | 11/2008 | Randier | |
| 2013/0282264 A1 * | 10/2013 | Bastiaensen | G08G 1/0129 701/119 |
| 2014/0088855 A1 * | 3/2014 | Ferguson | G08G 1/166 701/117 |
| 2017/0010106 A1 * | 1/2017 | Shashua | G01C 21/3407 |
| 2020/0019894 A1 * | 1/2020 | Jin | G05D 1/0291 |

FOREIGN PATENT DOCUMENTS

| | | |
|---|---|---|
| DE | 102011083375 A1 | 3/2013 |
| DE | 102013202053 A1 | 8/2014 |
| DE | 102013205840 A1 | 10/2014 |
| DE | 102014200638 A1 | 7/2015 |
| DE | 102015213743 A1 | 1/2017 |

* cited by examiner

METHOD FOR OPERATING A VEHICLE SYSTEM DESIGNED TO DETERMINE A TRAJECTORY TO BE FOLLOWED AND/OR TO PERFORM DRIVING INTERVENTIONS, METHOD FOR OPERATING A CONTROL SYSTEM, AND MOTOR VEHICLE

TECHNICAL FIELD

The present application relates to a method for operating a vehicle system of a motor vehicle. The method is designed to determine a trajectory to be followed and/or to perform driving interventions. In addition, the present application relates to a method for operating a control system comprising a motor vehicle and a computation device external to the motor vehicle, and to a motor vehicle.

BACKGROUND

In conventional motor vehicles, vehicle systems designed to determine a trajectory to be followed and/or to perform driving interventions realize driver assistance functions, such as a lane departure warning system, or, in motor vehicles designed for completely autonomous operation, assume all required interventions in transverse and longitudinal guidance. In doing so, the trajectory and/or the driving intervention to be performed are typically calculated based on sensor data of a sensor device of the motor vehicle. For instance, with the aforesaid lane departure warning system, it is known to determine, based on lane markings detected by means of a camera, a trajectory that guides the vehicle within a roadway segment delimited by the lane markings, and/or to undertake a driving intervention in the form of a steering intervention if undesired departure from such a roadway segment is imminent.

However, conventional vehicle systems suffer from the drawback that their availability and thus their assisting function is dropped if the sensor device cannot detect lane markings with adequate certainty.

Likewise, in many cases a trajectory determined by a vehicle system and/or a steeling intervention performed by the vehicle system is not the equivalent of the driving behavior that a practiced human driver would demonstrate. The steering movement resulting from control by the vehicle system is therefore perceived by occupants of the motor vehicle as unnatural and less comfortable.

The underlying technical problem is therefore to provide an option for more user-friendly operation, in particular with respect to availability and driving comfort, of a vehicle system designed to determine a trajectory to be followed and/or to perform vehicle interventions.

BRIEF DESCRIPTION OF THE DRAWINGS/FIGURES

DETAILED DESCRIPTION

Figure 1:
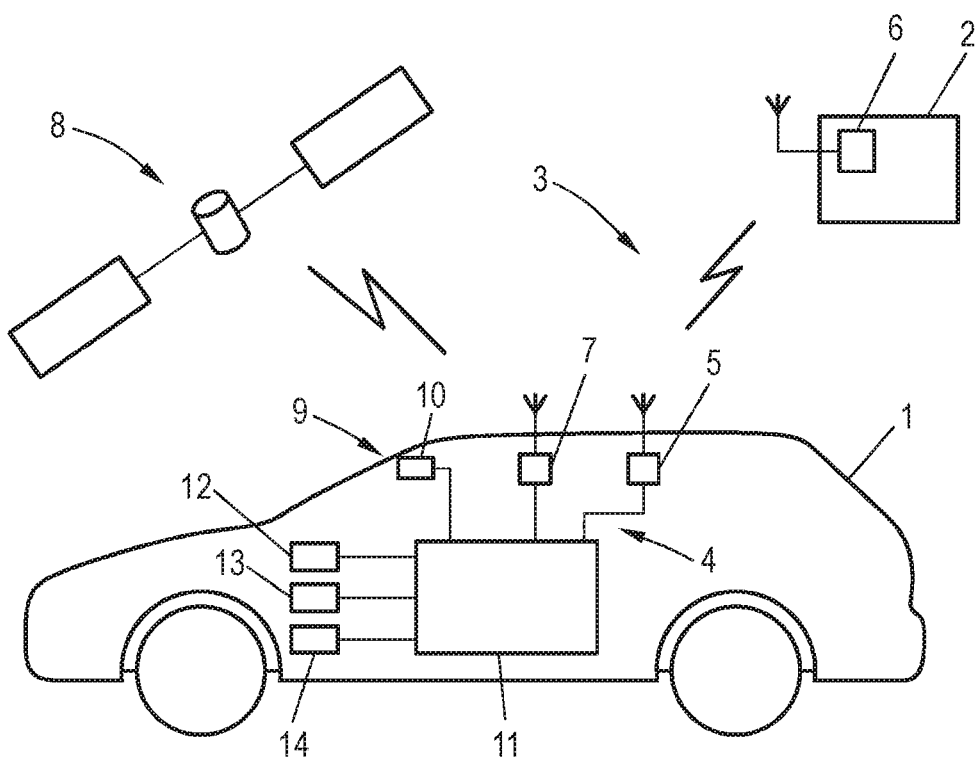
FIG. 1 is a sketch of an inventive motor vehicle and a control system, in accordance with some embodiments.

A method is disclosed for operating a vehicle system designed to determine a trajectory to be followed and/or to perform vehicle interventions. Also, a communication device on the vehicle system side is disclosed. The communication device receives from a computation device external to the motor vehicle a lane map describing travel lanes that are determined by the computation device from actual driving courses of other vehicles in the past and that relate to a region surrounding the motor vehicle, and a control device on the vehicle system side determines a trajectory to be followed by the motor vehicle and/or performs a transverse guiding intervention depending on the lane map.

In accordance with some embodiments, the method may comprise determining, based on actually traveled driving courses of other drivers, a lane map that is taken into consideration during the determination of the trajectory to be followed and/or the performance of the transverse guiding intervention in order in this way to realize a travel behavior of the motor vehicle that is better adapted to human driving behavior and is, therefore, also more comfortable for a vehicle occupant. To this end, a communication device of the vehicle system receives the lane map from a computation device external to the motor vehicle, for example a backend server, in particular via a mobile data connection. The computation device may to this end continuously obtain driving courses recorded by the other vehicles in the form of position sequences and determine therefrom specific travel lanes, preferably using statistical evaluation and/or similarity analysis. The totality of these travel lanes may therefore be described using lane map data from which the computation device derives or determines the lane map to be transmitted. Such a travel lane describes, for example, the path that the other vehicles have traveled in order to follow a roadway segment delimited by lane markings. Because the other vehicles are always transmitting current driving course information to the computation device, a highly accurate and very current description of realistic travel lanes is created that may be transmitted, in whole or in part, as a lane map to the motor vehicle. The control device then determines the trajectory to be followed or performs the transverse guiding intervention depending on the lane map, that is, in particular taking into consideration a travel lane described by the lane map.

The advantage is that the trajectory and/or the driving intervention much more closely resembles human driving behavior than a trajectory or driving intervention that has been determined purely computationally. Thus, for an occupant, the driving behavior of the motor vehicle is perceived as so much more natural, so that it is ultimately considered much more comfortable. Moreover, determination of the trajectory and/or the transverse guiding intervention may be made when there are no sensor data from a sensor device or when these data are not adequately processable.

In accordance with some embodiments, the control device selects a travel lane to be used for determining the trajectory and/or for performing the transverse guiding intervention from a plurality of travel lanes described in the surrounding region. For travel on multilane roadways, such as highways, the lane map typically describes a plurality of essentially parallel travel lanes that result from other vehicles during their travel, having oriented themselves to the lane marking, and having adhered to the delimitations of a roadway segment represented by said lane markings. It is therefore possible to initially allocate such a travel lane to the motor vehicle in order to obtain the correct travel lane for determining the trajectory and/or performing the transverse guiding intervention.

In accordance with some embodiments, a selection is made taking into consideration position information from a position sensor on the vehicle system side. The position information describing the position of the motor vehicle in a geodetic coordinate system may be determined by means of a global satellite navigation system, for instance, and a travel lane may be selected from the lane map, which is usefully related to a geodetic coordinate system. Alternatively or in addition, the selection may also be made taking into consideration sensor data from a sensor device on the vehicle system side. These sensor data may provide, for example, image data as sensor data that describe the course of lane markings, wherein the selection of a travel lane to be used is made by comparing the lane markings or the roadway segments delimited thereby to the course of the travel lanes.

It accordance with some embodiments, the lane map for at least one described travel lane may comprise behavior information derived from the operating behavior of the other vehicles, wherein the selection, in particular of at least two branching travel lanes, is made by comparing an instantaneous operating status of the motor vehicle to the behavior information. The computation device may therefore add to the lane map the behavior information on which the selection of the travel lane to be used depends. Specifically, the behavior information may describe a speed value derived from the speeds of the other vehicles traveling the travel lane and/or may describe the actuation of a turn signal of the other vehicles when traveling the travel lane. Thus, it is possible, for example, to make a more precise selection of the travel lane to be used if it is known that a plurality of drivers that have followed one travel lane previously used or did not use the turn signal or changed or maintained their speed in a characteristic manner. If the motor vehicle exhibits comparable behavior—if, for example, the turn signal is activated or if there is braking the travel lane selected is the one in which the behavior information indicates that drivers who have followed the travel lane in the past and have also braked and actuated the turn signal.

In accordance with some embodiments, the control device determines a trajectory, it is additionally useful when, for determining the trajectory to be followed, a planned trajectory determined by the control device is subjected to a plausibility check using the lane data. The lane map, in particular the selected travel lane, may then be used to conduct a plausibility check on the computed planned trajectory. The planned trajectory may then be determined as the trajectory, if it is plausible for the lane data, using the lane map, for instance by combining a segment of the planned trajectory with a segment of the travel lane, or may be discarded if it does not have a course that is plausible with respect to the lane data. It is particularly preferred that the planned trajectory is determined based on sensor data of the vehicle system side or of a sensor device on the vehicle system side. The sensor device may comprise a camera, for example, in order to significantly improve the quality of trajectories determined in a conventional manner by taking the lane map into consideration.

In accordance with some embodiments, the lane map comprises at least one form of frequency information that may be taken into consideration during the determination of the trajectory, this frequency information relating to branching travel lanes and describing the frequency with which the branching travel lanes are traveled by the other vehicles. In other words, a prediction of the travel path of the motor vehicle may be realized based on the frequency information that the computation device adds to the lane map. If the motor vehicle is traveling, for example, toward an intersection or a T-intersection, the travel lane that corresponds to the travel path of the majority of the other vehicles is used for determining the trajectory. In this way a future travel path of the motor vehicle may be estimated on a reliable statistical basis. During the determination of the trajectory it is furthermore particularly advantageous to jointly take into consideration the previously described behavior information and the frequency information, and, for instance, to perform a plausibility check on the trajectory course that results, based on the frequency information by comparing the behavior information to the instantaneous operating status of the motor vehicle.

In accordance with some embodiments, a transverse guiding intervention may be performed. A transverse guiding intervention may be computed by the vehicle system, in particular based on sensor data of the vehicle system side or of a sensor device on the vehicle system side. The transverse guiding intervention is subjected to a plausibility check for performing it using the lane map. For example, with a lane departure warning system, if a transverse guiding intervention is to be performed soon based on the sensor data, this transverse guiding intervention may be subjected to a plausibility check in a manner similar to the previously described plausibility check of a planned trajectory using the lane map, in particular the selected travel lane. In this case, as well, it is possible to combine the computed transverse guiding intervention with a transvers guiding intervention that results from the travel lane. Alternatively or in addition, the control device may also perform the transverse guiding intervention such that the motor vehicle follows a travel lane or the selected travel lane. In a partially or completely autonomously operated motor vehicle, the transverse guidance may be adjusted, at least temporarily, using the highly precise and very current lane map. In doing so, sensor data from the sensor device may naturally continue to be taken into consideration in order to ensure, for example, that there are no obstructions on the roadway. In this manner, as well, it is possible to introduce only a single change between the two roadway segments.

In accordance with some embodiments, the control device may regularly request from the computation device a lane map describing a surrounding region changed by the movement of the motor vehicle. Such an embodiment advantageously makes it possible to use the memory resources on the vehicle system side sparingly for the lane map and still always to maintain an up-to-date lane map.

In accordance with yet another embodiments, the motor vehicle may also transmit to the computation device driving course information with respect to driving courses it has traveled itself in addition to data for determining behavior information by means of the communication device on the vehicle system side. The computation device may take this information into consideration when determining and/or updating a lane map.

In accordance with some embodiments, a method for operating a control system comprising a motor vehicle and a computation device external to the motor vehicle is disclosed. The vehicle system of the motor vehicle is operated according to the method previously described herein, and the communication device on the computation device side transmits the lane map to the motor vehicle.

In accordance with some embodiments, for determining the lane map, the computation device receives from the other vehicles the driving course information describing the actual driving courses via the communication device on the computation device side.

When the communication device on the computation device side receives driving course information describing driving courses divided into driving sub-courses, such driving sub-courses may be limited in particular to a certain segment length for example one kilometer, in order to permit anonymization of the driving course information.

In accordance with yet another embodiments, for producing the lane map data being used for the lane map to be transmitted, the computation device continuously updates based on received driving course information. For example, if it is possible to derive from the driving course information that a travel lane previously described by the lane map data is no longer being traveled, it may be concluded from this that it is no longer possible to travel the corresponding roadway segments, for instance due to it being temporarily blocked. A previously described travel lane may then be discarded. Likewise, the course of a previously described travel lane may be corrected, e.g., if a structural change to the roadway course is added to the lane map data or if a new travel lane is added to the lane map data, e.g., due to a release of a roadway segment that previously could not be traveled or due to the release of a street that could not previously be traveled. These measures allow the extent of the updating for a provided lane map to be further improved.

In accordance with some embodiments, the computation device may transmit to the motor vehicle an updated lane map upon satisfaction of an updating criterion, in particular an updating criterion that describes the magnitude of at least one update. It is therefore suggested that the computation device transmits to the motor vehicle an updated lane map upon each update or only upon updates that reach a certain magnitude. In this way the motor vehicle advantageously obtains an updated lane map in an event-driven manner.

In accordance with some embodiments, a motor vehicle comprising a communication device is disclosed. The communication device may be designed to communicate with a computation device external to the motor vehicle and a vehicle system may be designed to determine a trajectory to be followed and/or to perform driving interventions, which vehicle system may be operated according to the inventive method for operating a vehicle system designed to determine a trajectory to be followed and/or to perform vehicle interventions.

All embodiments disclosed herein including a method for operating a vehicle system of a motor vehicle designed to determine a trajectory to be followed and/or to perform vehicle interventions, a method for operating a control system comprising a motor vehicle and a computation device external to the motor vehicle, and for the inventive motor vehicle may be transferred analogously among one another so that it is also possible to attain the advantages described in this regard with each of the other embodiments.

FIG. 1 is a sketch of an inventive motor vehicle and a control system, in accordance with some embodiments. A control system 3 comprising a motor vehicle 1 and a computation device 2 external to the motor vehicle and in the form of a backend server are shown in the FIG. 1.

The motor vehicle 1 has a vehicle system 4 designed to determine a trajectory to be followed and to perform vehicle interventions, said vehicle system comprising a communication device 5 for communicating with a communication device 6 of the computation device 2, a position sensor 7 for determining the position of the motor vehicle 1 using a global satellite navigation system 8 and a sensor device 9. The latter comprises a camera 10 detecting the front field of the motor vehicle 1 and other sensors designed for sensing the environment (not shown), for example in the form of at least one radar sensor and/or at least one lidar sensor and/or at least one ultrasound sensor. The vehicle system 4 furthermore comprises a control device 11 that communicates with the aforesaid components and is designed to control a drive device 12, a steering device 13, and a braking device 14 of the vehicle system 4.

Figure 2:
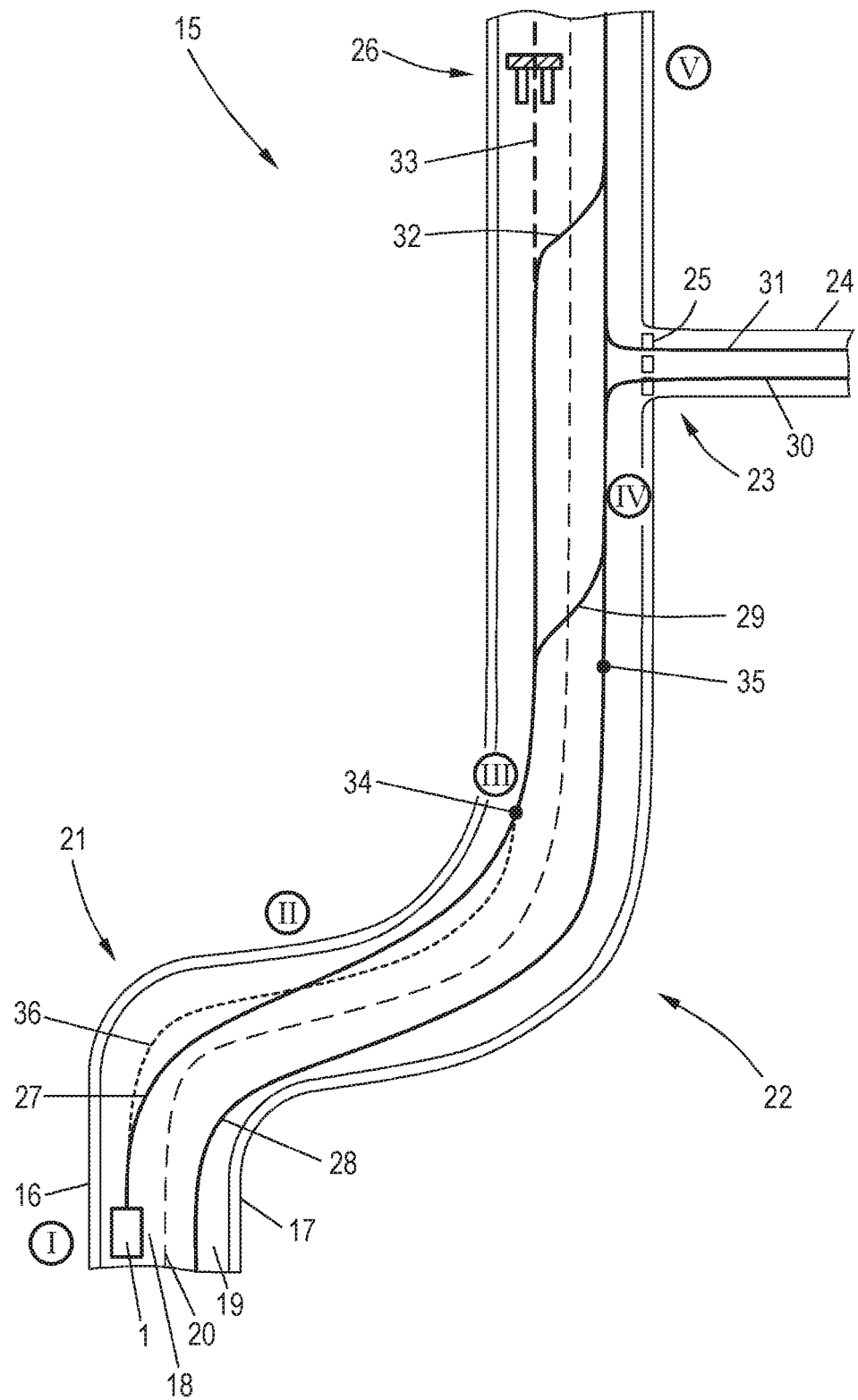
FIG. 2 depicts an example of a street course, in accordance with some embodiments.

FIG. 2 depicts an example of a street course, in accordance with some embodiments. An example of a street course for operating the control system 3 and an associated method for operating the vehicle system 4 is shown.

The street course describes a street 15 that has on its left-hand edge a delimiting lane marking 16, on its right-hand edge a delimiting lane marking 17, and a lane marking 20 dividing the street 15 into a left-hand roadway segment 18 and a right-hand roadway segment 19. Both roadway segments 18, 19 are provided for travel in the same direction of travel, wherein for the purpose of facilitating understanding no opposing traffic lane is shown. The street 15 furthermore has two curves 21, 22 that follow in close succession to one another and, further on, a side street 24 intersects it in a T-intersection 23, wherein in the region of the T-intersection 23 the lane marking 17 is interrupted by another lane marking 25. In addition, past the T-intersection 23, the left-hand roadway segment 18 is blocked by a construction site 26. It may be seen that the motor vehicle 1 at a time I is disposed on the left-hand roadway segment 18 of the street 15 and is traveling toward the curve 21.

In accordance with some embodiments, the control system 3, at a time prior to time I, the communication device 6 on the computation device side initially receives from other vehicles (not shown) their driving course information, describing actual driving courses, in the form of individual position sequences. To ensure anonymity and data protection for the drivers of these vehicles, the driving courses are divided into driving sub-courses, each of which describes a segment length of one kilometer. The computation device 2 determines from this driving course information lane map data that describe a plurality of travel lanes 27-31, depicted in FIG. 2 only in the region of the street 15. To this end, the computation device 2 analyzes each of the driving courses or driving sub-courses for similar patterns and from this forms the travel lanes 27-31, for example by means of averaging.

The travel lanes 27-31, by combining suitable, actual driving courses of other motorists, therefore describe determined representative travel lanes for traveling on the street 15, wherein of course individual received driving courses that are not in reasonable agreement with the previous course of a traffic lane cannot be used in the determination. Thus the travel lanes 27, 28 result in that the other motorists, while traveling on the street 15, have traveled essentially on the roadway segments 18, 19 defined by the lane markings 16, 17, 20 or some of the vehicles have turned from the street 15 into the side street 24 according to the travel lane 30 or have turned from the side street 24 into the street 15 according to the travel lane 31. In addition, other vehicles have moved according to the travel lane 29 from the left-hand roadway segment 18 to the righthand roadway segment 17, e.g. in order to turn into the side street 24 further down the course of the street.

At this point it should be noted that, as may be seen, the travel lanes 27, 28 in the region of the curves 21, 22 do not follow a center line between the lane markings 16, 20 and 20, 17, but instead reflect naturally developed driving behavior of the drivers of the other vehicles in the manner of "collective intelligence." The travel lanes 27, 28 are therefore to a certain extent ideal lines that many drivers follow in the region of the curves 21, 22, instead of an imaginary center line. The lane map data therefore simulate natural driving behavior of human drivers, this behavior ultimately including conditions for the driving comfort of these drivers.

In addition to receiving the driving course information, the computation device 2 receives from the other vehicles information that describes the instantaneous speed of the specific vehicle and the specific operating status of its turn signals. From this information the computation device 2 derives behavior information that it records with a travel lane of the lane map data. Thus, for instance, a reduction in speed may be recorded with a position 34 on the travel lane 27 and actuation of the right turn signal of several vehicles may be recorded, whereupon these vehicle no longer follow the travel lane 27 and move into the travel lane 28 via the travel lane 29. Likewise, at a position 35 a comparable reduction in speed and actuation of the right turn signal may record that other vehicles having this operating behavior have turned into the side street 24 along the travel lane 30. Moreover, the computation device 2 determines, for the branching travel lanes 28, 30, frequency information that describes the portion of the vehicles that have turned into the side street 24 according to the travel lane 30 and the portion of the vehicles that have remained on the street 15 according to the travel lane 28.

In accordance with some embodiments, the control system 3, and/or the computation device 2 furthermore continuously updates the lane map data so that, for example, an earlier travel lane 33 that was determined prior to the erection of the construction site 26 is discarded when it is determined that a certain number of vehicles no longer travel this segment and change to the righthand roadway segment 19 according to the travel lane 32.

At time I, at the request of the motor vehicle 1, the computation device 2 transmits to the motor vehicle 1 a lane map determined from the lane map data and describing a region surrounding the motor vehicle 1. In addition, the computation device 2 transmits an updated lane map to the motor vehicle 1 when updates accomplished satisfy an update criterion so that there is always a highly accurate and very current lane map in the vehicle system 4. The surrounding region may be selected to be very large, and in particular it may comprise all of the travel lanes described by the lane map data so that ultimately a global lane map is transmitted. According to one preferred exemplary embodiment, however, a lane map describing a delimited region surrounding the motor vehicle 1 is transmitted regularly when requested by the vehicle system 4.

In accordance with some embodiments, a method for operating the vehicle system 4, and the control system 3, is explained in greater detail:

At time I the control device 11 requests a lane map from the computation device 2, via the communication device 5. To this end, the control device transmits its position, detected by means of the position sensor 7, to the computation device 2 and receives the lane map that in this instance describes the surrounding region illustrated in FIG. 2 and comprising the street 15 and the side street 24.

First the motor vehicle 1 is allocated to one of the travel lanes 27, 28. To this end, based on a geodetic coordinate of the motor vehicle determined by means of the position sensor 7, the control device 4 selects the travel lane 27, since the latter is closer to the position of the motor vehicle 1 than the travel lane 28. According to another exemplary embodiment, alternatively or in addition the selection may be made taking into consideration sensor data from the sensor device 9. To this end, image data from the camera 10, which data describe the lane markings 16, 17, 20, may be evaluated to determine the roadway segment 17, 18 on which the motor vehicle 1 is disposed.

The method now makes possible several advantageous options to determine a trajectory and/or to perform a transverse guiding intervention using the vehicle system 4, which options shall be described in the following using a number of exemplary embodiments, but which may also be combined with one another:

In accordance with some embodiments, the control device 11 first determines, based on sensor data from the sensor device 9, a planned trajectory 36 that corresponds to the imaginary center line of the left-hand roadway segment 18. To this end, the control device 11 evaluates in particular the lane markings 16, 20 detected by means of the camera 10. The planned trajectory 36 determined in this manner is subjected to a plausibility check to determine a trajectory to be followed using the allocated travel lane 27, wherein it may be checked whether the course of the planned trajectory 36 may be harmonized with the travel lane 27 in the first place. If this is not the case, the planned trajectory may be discarded, for instance, or combined, at least in part, with the travel lane 27 to determine the trajectory to be followed. For combining, corresponding segments of the planned trajectory 36 are replaced with segments of the travel lane 27 or an averaged trajectory course is determined.

In accordance with another embodiments, a trajectory to be followed is determined that predicts the further travel path of the motor vehicle 1. If the motor vehicle 1 is at the position 34 at a time III, the instantaneous operating status of a turn signal (not shown) and the instantaneous speed of the motor vehicle 1 are compared to the behavior information recorded with the lane map and the trajectory is determined either based on the travel lanes 29, 28 or according to further travel on the travel lane 27. Similarly, using an evaluation of these operating statuses and comparison with the behavior information at a time IV, as well, a trajectory is determined that, according to the travel lanes 28, 30, describes turning into the side street 24, or, according to continued travel along the travel lane 28, describes remaining on the righthand roadway segment 19. In this latter described option, alternatively or in addition, the trajectory to be followed may be determined using the frequency information, wherein the trajectory to be followed is selected such that the motor vehicle 1 follows the path traveled by the majority of the other vehicles, that is, for instance, does not turn into the side street 24.

In accordance with some embodiments, the vehicle system 4 performs a transverse guiding intervention by acting on the steering device 13 to maintain travel on the roadway segment 18, therefore it realizes the function of a lane departure warning system. To this end, again, image data from the camera 10 are evaluated and from these data it is derived whether the motor vehicle 1 continues to follow the roadway segment 18. At the time II the driver of the motor vehicle 1, according to his human driving behavior, now does not follow the imaginary center line of the roadway segment 18, but instead drives the ideal line slightly shifted in the direction of the lane markings 16. Now this driving behavior of the motor vehicle 1 is subjected to a plausibility check using the travel lane 27. Therefore there is no uncomfortable transverse intervention when the travel path of the motor vehicle 1 is plausible for the travel lane 27, or a transverse guiding intervention is not performed unless the motor vehicle 1 moves too close to the lane marking 16 even taking into consideration the travel lane 27. In addition, the transverse guiding intervention may also be determined such that the motor vehicle 1 again moves in the direction of the travel lane 27 so that a steering movement determined based on the sensor data from the sensor device 9 is combined with a steering movement corresponding to the travel lane 27 for performing a transverse guiding intervention. To this end a steering angle determined by section based on the sensor data is replaced with a steering angle corresponding to the travel lane 27 or a mean value of such a steering angle is found.

In accordance with some embodiments, the transverse guiding interventions are performed automatically by the control device 11 in the context of partially or completely autonomous operation of the motor vehicle 1 such that the motor vehicle 1 departs the travel lane 27, wherein naturally there may be obstacle detection based on sensor data from the sensor device 9. In this case, during the further course of the travel lane 27, in particular in the region before the construction site 26, there is an automatic change in the roadway segment according to the travel lane 32 to the travel lane 28. However, it is also possible for just an indication to be provided to the driver so that he takes over the steering function to perform the lane change. It is also possible that in addition, based on the behavior information and the frequency information, the drive device 12 and the brake device 14 are triggered by the control device 11 to realize automatic longitudinal guidance of the motor vehicle.

Naturally all of the aforesaid exemplary embodiments may also be combined such that a transverse guiding intervention to be performed occurs to leave a trajectory to be followed that was determined depending on the lane map.

At a time V the motor vehicle 1 will soon leave the surrounding region described by the lane map, for which reason the control device 11 requests from the computation device 2 a lane map relating to a new surrounding region. In addition, similar to the other vehicles described in the foregoing, during the travel of the motor vehicle 1 the vehicle system 4 also itself transmits driving course information to the computation device 2, which takes this driving course information into consideration in determining the lane map data.

The invention claimed is:

1. A method, comprising:
    anonymizing, at a computation device, actual driving courses by dividing the actual driving courses into a plurality of driving sub-courses to provide data protection, wherein the actual driving courses are from a plurality of vehicles that have been driven on a plurality of travel lanes in a past;
    determining, at the computation device, a lane map based on the plurality of driving sub-courses;
    receiving, at a communication device from the computation device, the lane map describing the plurality of travel lanes;
    based on the received lane map, determining, at a control device, a trajectory to be followed by a motor vehicle; and
    in response to the determined trajectory, performing, at the control device, driving interventions and transverse guiding intervention,
    wherein the driving interventions and the transverse guiding intervention are performed based on the received lane map,
    wherein the communication device is located on a vehicle system side of a vehicle system of the motor vehicle and the control device is located on the vehicle system side,
    wherein the plurality of travel lanes are related to a region surrounding the motor vehicle, and
    wherein the computation device is external to the motor vehicle.

2. The method of claim 1, further comprising selecting a travel lane of the plurality of travel lanes for at least one of: determining the trajectory and performing the transverse guiding intervention.

3. The method of claim 2, further comprising selecting the travel lane based on other information, wherein the other information is at least one of: position information from a position sensor on the vehicle system side and sensor data from a sensor device on the vehicle system side.

4. The method of claim 2, further comprising comparing an instantaneous operating status of the motor vehicle to behavior information of the travel lane, wherein the plurality of travel lanes comprise at least two branching travel lanes, and wherein the behavior information is derived from operating behavior of the plurality of vehicles.

5. The method of claim 4, wherein the behavior information comprises at least one of:
    a speed value derived from speed of the plurality of vehicles travelling on the travel lane; and
    an actuation of a turn signal of the plurality of vehicles traveling on the travel lane.

6. The method of claim 1, further comprising performing, at the control device, a plausibility check based on at least one of sensor data from the vehicle system and a sensor device on the vehicle system side to determine the trajectory to be followed.

7. The method of claim 1, wherein the received lane map comprises frequency information, wherein the frequency information is one of relating to branching travel lanes and describing a frequency with which the branching travel lanes are traveled by the plurality of vehicles, and further comprising determining the trajectory based on the frequency information.

8. The method of claim 1, further comprising:
    performing, at the control device, a plausibility check to perform transverse guiding intervention based on at least one of sensor data from the vehicle system and a sensor device on the vehicle system side; and
    combining a segment of a travel lane from the received lane map in response to determining that the trajectory to be followed by the motor vehicle is plausible to cause the motor vehicle to follow a selected travel lane.

9. The method of claim 1, further comprising requesting, from the control device to the computation device, a new lane map related to a changed surrounding region, wherein the changed surrounding region is caused by a movement of the motor vehicle.

10. A method, comprising:
    anonymizing, at a computation device, actual driving courses by dividing the actual driving courses into a plurality of driving sub-courses to provide data protection, wherein the actual driving courses are from a plurality of vehicles that have been driven on a plurality of travel lanes in a past;
    determining, at the computation device, a lane map based on actual the plurality of driving sub-courses;
    receiving, at a vehicle system from the computation device, the received lane map describing the plurality of travel lanes;
    based on the received lane map, determining, at the vehicle system, a trajectory to be followed by a motor vehicle; and
    in response to the determined trajectory, performing, at the vehicle system, driving interventions and a transverse guiding intervention,
    wherein the plurality of travel lanes are related to a region surrounding the motor vehicle, wherein the driving interventions and the transverse guiding intervention are performed based on the received lane map, and wherein the computation device is external to the motor vehicle.

11. The method of claim 10, further comprising receiving, at the computation device, driving course information via a communication device on the computation device side, wherein the driving course information is actual driving courses of the plurality of vehicles.

12. The method of claim 11, wherein the driving course information is divided into driving sub-courses.

13. The method of claim 11, further comprising, in response to the received driving information, updating, at the computation device, data used for producing the lane map.

14. The method of claim 13, further comprising transmitting, from the computation device to the motor vehicle, an updated lane map in response to satisfaction of an updating criterion, wherein the updating criterion comprises a magnitude of an update.

15. A motor vehicle, comprising:
a communication device; and
a vehicle system, wherein the communication device is communicatively coupled with a computation device, wherein the computation device is external to the motor vehicle and is configured to:
anonymize actual driving courses by dividing the actual driving courses into a plurality of driving sub-courses to provide data protection, wherein the actual driving courses are from a plurality of vehicles that have been driven on a plurality of travel lanes that are related to a region surrounding the motor vehicle in a past, determine a lane map based on the plurality of driving sub-courses, and wherein the vehicle system is configured to:
receive the lane map describing the plurality of travel lanes, determine a trajectory to be followed by the motor vehicle based on the received lane map, and in response to the determined trajectory, perform driving interventions and a transverse guiding intervention based on the received lane map.

* * * * *